(12) United States Patent
Nakamura

(10) Patent No.: US 9,961,741 B2
(45) Date of Patent: May 1, 2018

(54) CIRCUIT DEVICE, LIGHTING DEVICE, AND VEHICLE USING THE SAME

(71) Applicant: Panasonic Intellectual Property Management Co., Ltd., Osaka (JP)

(72) Inventor: Toshiaki Nakamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 182 days.

(21) Appl. No.: 15/194,687

(22) Filed: Jun. 28, 2016

(65) Prior Publication Data

US 2017/0013694 A1    Jan. 12, 2017

(30) Foreign Application Priority Data

Jul. 8, 2015    (JP) .................................. 2015-137195

(51) Int. Cl.
*H05B 33/08*    (2006.01)
*H02H 11/00*    (2006.01)

(52) U.S. Cl.
CPC ....... *H05B 33/0887* (2013.01); *H02H 11/003* (2013.01); *H05B 33/0815* (2013.01)

(58) Field of Classification Search
CPC . B60Q 1/04; H02H 3/003; H02H 3/06; H02H 11/003; H05B 33/0887; H05B 33/0815; H05B 37/02; H05B 33/08; H05B 33/0833
USPC .... 315/77, 82, 200 R, 209 R, 224–226, 291, 315/307, 308, 312
See application file for complete search history.

(56) References Cited

U.S. PATENT DOCUMENTS

| 7,924,542 | B2 * | 4/2011 | Takahashi | G05F 1/575 361/93.1 |
| 2002/0141124 | A1 * | 10/2002 | Ito | H02H 11/003 361/84 |
| 2004/0075393 | A1 | 4/2004 | Ito et al. | |
| 2011/0148319 | A1 * | 6/2011 | Terazawa | H02M 3/33507 315/291 |
| 2012/0032591 | A1 | 2/2012 | Matsui et al. | |

(Continued)

FOREIGN PATENT DOCUMENTS

| JP | 2000-333384 A | 11/2000 |
| JP | 2002-297250 A | 10/2002 |
| JP | 2004-136719 A | 5/2004 |

(Continued)

*Primary Examiner* — Jimmy Vu
(74) *Attorney, Agent, or Firm* — Renner Otto Boisselle & Sklar, LLP

(57) ABSTRACT

In a circuit device, a plurality of protection circuits are disposed between a plurality of first power supply connecting terminals and a first input terminal of a load circuit. A switching element of each of the plurality of protection circuits is connected between a first power supply connecting terminal and a first input terminal, and is turned on when a DC power supply is connected with a normal polarity to the first power supply connecting terminal. Each of the plurality of protection circuits a parasitic diode that is connected in parallel to the switching element between a corresponding first power supply connecting terminal and a first input terminal in a direction where a current having a normal polarity is caused to flow. The reset circuit performs periodically a reset operation of temporarily turning off the switching element.

20 Claims, 6 Drawing Sheets

(56) References Cited

U.S. PATENT DOCUMENTS

2014/0126261 A1* 5/2014 Newman, Jr. ......... H02M 1/081
363/128

FOREIGN PATENT DOCUMENTS

| JP | 2012-38496 A | 2/2012 |
| JP | 2013-535071 A | 9/2013 |
| WO | WO 2011/139421 A1 | 11/2011 |

* cited by examiner

CIRCUIT DEVICE, LIGHTING DEVICE, AND VEHICLE USING THE SAME

CROSS-REFERENCE TO RELATED APPLICATION

This application claims the benefit of priority of Japanese Patent Application Number 2015-137195, filed on Jul. 8, 2015, the entire contents of which are hereby incorporated by reference.

TECHNICAL FIELD

The present disclosure relates to circuit devices, lighting devices, and vehicles using the same, and more particularly, a circuit device receiving electrical power from a DC power supply, a lighting device including the circuit device, and a vehicle including the light device.

BACKGROUND ART

Conventionally, there have been proposed light source lighting circuits each which receive electrical power from a DC power supply to light a light source. Each light source lighting circuit includes a backflow preventer that protects a circuit when the DC power supply is connected to the circuit with reverse polarity, and a current controller that supplies a driving current to the light source (see, for example, JP 2012-38496 A, hereinafter referred to as "Document 1").

The backflow preventer in the light source lighting circuit of Document 1 includes a first control terminal and a second control terminal each which are connected to the DC power supply via a switch. The current controller includes a common terminal that is connected to the first control terminal and the second control terminal, and a switching terminal that is connected to the first control terminal. The current controller operates with a DC power supply voltage applied to the common terminal to supply the driving current to the light source. Also, the current controller changes the driving current supplied to the light source according to whether or not a voltage is applied to the switching terminal, that is, whether or not the DC power supply voltage is applied to the first control terminal, and changes brightness of the light source according to the changed driving current.

Here, the backflow preventer includes a first P-channel FET connected between the first control terminal and the common terminal, and a second P-channel FET and a diode connected in series between the second control terminal and the common terminal.

When the DC power supply voltage is applied to the first control terminal, the first P-channel FET becomes in an on-state, and the second P-channel FET becomes in an off-state, and the DC power supply voltage is applied to the current controller via the first P-channel FET. When the DC power supply voltage is not applied to the first control terminal and the DC power supply voltage is applied to the second control terminal, the second P-channel FET becomes in the on-state, and the DC power supply voltage is applied to the current controller via the second P-channel FET and the diode. Also, when the DC power supply voltage with reverse polarity is applied to the first control terminal or the second control terminal, the first P-channel FET and the second P-channel FET are in the off-state, and the current controller is protected by the diode.

In the light source lighting circuit described in Document 1, when the DC power supply voltage is not applied to the first control terminal and the DC power supply voltage is applied to the second control terminal, the DC power supply voltage is applied to the current controller via the second P-channel FET and the diode. Because a forward voltage of the diode is generally higher than an on-voltage of the P-channel FET, when the DC power supply voltage is not applied to the first control terminal and the DC power supply voltage is applied to the second control terminal, a large loss occurs compared with the case where the DC power supply voltage is applied to the first control terminal.

SUMMARY

The present disclosure is made in view of the above problem, and an object of the present disclosure is to provide a circuit device which achieves, at a low loss, a protection function when a DC power supply is connected with reverse polarity, a lighting device, and a vehicle.

A circuit device according to an aspect of the present disclosure includes a plurality of first power supply connecting terminals, a second power supply connecting terminal, a load circuit, a plurality of protection circuits, and a reset circuit. The plurality of first power supply connecting terminals are connected to a first one of a positive electrode and a negative electrode of a DC power supply. The second power supply connecting terminal is connected to a second one of the positive electrode and the negative electrode of the DC power supply. The load circuit includes a first input terminal and a second input terminal. The plurality of first power supply connecting terminals are electrically connected in parallel to the first input terminal. The second power supply connecting terminal is electrically connected to the second input terminal. The plurality of protection circuits are respectively disposed between the plurality of first power supply connecting terminals and the first input terminal. Each of the plurality of protection circuits includes a switching element and a rectifying element. The switching element is connected between a corresponding first power supply connecting terminal of the plurality of first power supply connecting terminals and the first input terminal. The switching element is turned on when the DC power supply is connected with a normal polarity to the corresponding first power supply connecting terminal. The rectifying element is connected in parallel to the switching element in a direction in which a current flows from the corresponding first power supply connecting terminal to the first input terminal. The reset circuit is configured to perform periodically a reset operation of temporarily turning off the plurality of the switching elements of the plurality of protection circuits.

A lighting device according to an aspect of the present disclosure includes the circuit device and a housing that houses the circuit device. The load circuit of the circuit device includes a voltage conversion circuit that supplies electric power to a light source to turn on the light source.

A vehicle according to an aspect of the present disclosure includes the lighting device, the light source, and a vehicle body. The light source is turned on with electric power supplied from the lighting device. The light source is disposed on the vehicle body.

BRIEF DESCRIPTION OF DRAWINGS

The figures depict one or more implementations in accordance with the present teaching, by way of example only, not by way of limitations. In the figures, like reference numerals refer to the same or similar elements.

DESCRIPTION OF EMBODIMENTS

Hereinafter, embodiments in which a circuit device according to the present embodiment is applied to a lighting device lighting a head lamp of a vehicle (for example, car and automobile) will be described with reference to the drawings. Note that use of the circuit device is not limited to the lighting device and the circuit device may be applied to another use. The present invention is not limited to the following embodiments. Numerous modifications and variations can be made in accordance with the design and the like without departing from the technical idea according to the present invention.

Embodiment 1

Figure 1:
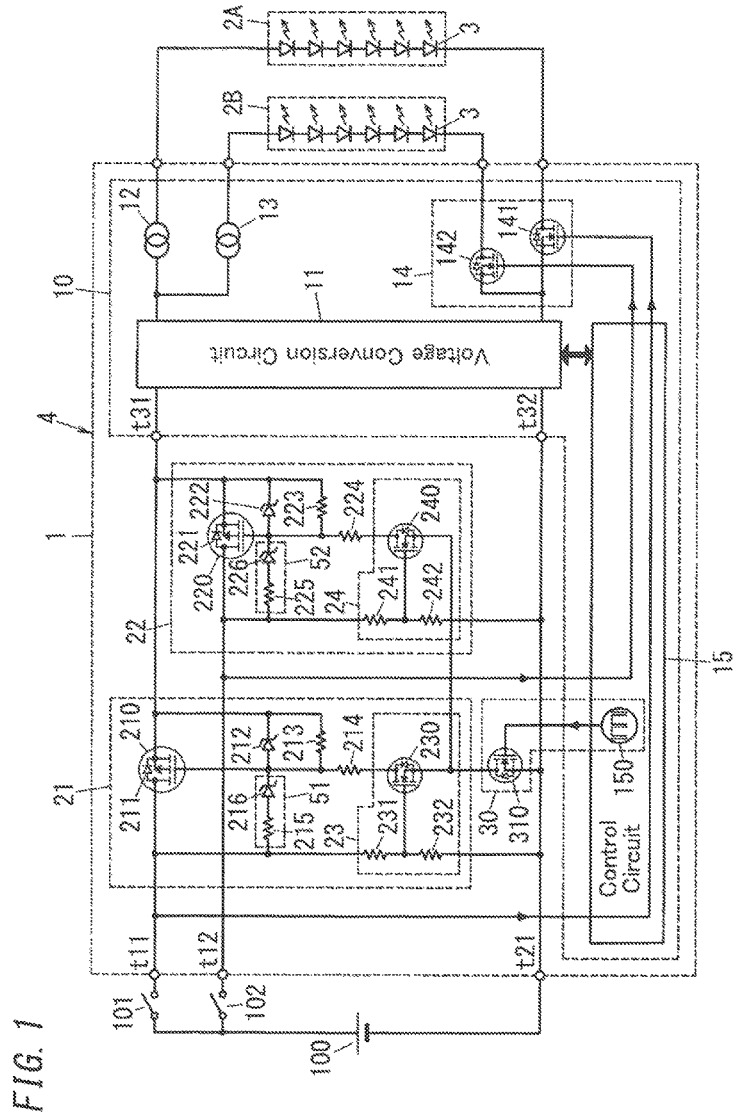
FIG. 1 is a circuit diagram of a lighting device according to Embodiment 1.

FIG. 1 is a circuit diagram of a lighting device 4 including a circuit device 1 according to Embodiment 1.

The circuit device 1 of the present embodiment includes two first power supply connecting terminals t11 and t12, a second power supply connecting terminal t21, a load circuit 10, protection circuits 21 and 22, and a reset circuit 30.

The circuit device 1 of the present embodiment is included in the lighting device 4 that lights light source blocks 2A and 2B with electric power supplied from a DC power supply 100. The examples of the DC power supply 100 are a battery and a DC power supply circuit that rectifiers and smoothes an AC voltage applied by an AC power supply and converts the AC voltage into a DC voltage. Each of the light source blocks 2A and 2B includes a plurality of LED (Light Emitting Diode) 3 that are connected in series to each other. Note that, each of the light source blocks 2A and 2B is not limited to including LEDs as the light source, and may include a solid state light source other than an LED (for example, an electroluminescence element such as an organic EL element) or an incandescent lamp.

An output of a positive electrode side of the DC power supply 100 is divided into two outputs to be connected to the first power supply connecting terminals t11 and t12 via the switches 101 and 102, respectively.

The first power supply connecting terminal t11 is electrically connected to the first input terminal t31 of the load circuit 10 via a switching element 210 of the protection circuit 21. The first power supply connecting terminal t12 is electrically connected to the first input terminal t31 via the switching element 220 of the protection circuit 22. Also, the second power supply connecting terminal t21 is electrically connected to the second input terminal t32 of the load circuit 10. Note that, the first power supply connecting terminals t11 and t12, the second power supply connecting terminal t21, the first input terminal t31, and the second input terminal t32 each may be a component (terminal) for connecting electric wires, may be a lead of an electronics component or a part of an electrical conductor formed on a circuit board as wiring, etc.

The load circuit 10 includes a voltage conversion circuit 11, constant current circuits 12 and 13, a switching circuit 14, and a control circuit 15.

The voltage conversion circuit 11 is a DC-DC conversion circuit that converts a DC voltage applied via the first input terminal t31 and the second input terminal t32 into a DC voltage that has a predetermined voltage value (voltage value required to light the light source blocks 2A and 2B as loads).

A series circuit of the constant current circuit 12, the light source block 2A, and the switching element 141, and a series circuit of the constant current circuit 13, the light source block 2B, and the switching element 142 are connected to an output end of the voltage conversion circuit 11 in parallel with each other.

The switching circuit 14 includes switching elements 141 and 142 that are respectively connected in series to the light source blocks 2A and 2B. The switching elements 141 and 142 each include an N-channel MOSFET (Metal Oxide Semiconductor Field Effect Transistor), for example. The switching elements 141 and 142 each are turned on or off according to a control signal inputted from the control circuit 15. When the switching element 141 is turned on, the light source block 2A is turned on. When the switching element 141 is turned off, the light source block 2A is turned off. Similarly, when the switching element 142 is turned on, the light source block 2B is turned on. When the switching element 142 is turned off, the light source block 2B is turned off.

The constant current circuit 12 is connected in series to the light source block 2A, and causes a constant current to flow through the light source block 2A to turn on the light source block 2A. The constant current circuit 13 is connected in series to the light source block 2B, and causes a constant current to flow through the light source block 2B to turn on the light source block 2B. Note that, the load circuit 10 may include a current feedback circuit or a mirror circuit instead of the constant current circuits 12 and 13. The current feedback circuit or the mirror circuit may control the current flowing through the light source blocks 2A and 2B so as to be constant by adjusting the on-voltages of the switching elements 141 and 142 based on the current value of the current flowing through the switching elements 141 and 142. In this case, a switching element of a circuit that causes the constant current to flow through the light source blocks 2A and 2B may be common to a switching element of the switching circuit 14 that turns on or off the light source blocks 2A and 2B.

The control circuit 15 controls operations of the voltage conversion circuit 11 and the switching circuit 14. The control circuit 15 monitors voltage levels of the first power supply connecting terminals t11 and t12, and determines whether or not the DC power supply 100 is connected to the first power supply connecting terminals t11 and t12 with the voltage levels of the first power supply connecting terminals t11 and t12.

The control circuit 15 turns on the switching element 141 to turn on the light source block 2A when the positive electrode of the DC power supply 100 is connected to the first power supply connecting terminal t11 and the voltage level of the first power supply connecting terminal t11 is equal to or more than a predetermined reference voltage. When the voltage level of the first power supply connecting terminal t11 is less than the reference voltage, the control circuit 15 turns off the switching element 141 to turn off the light source block 2A. Similarly, the control circuit 15 turns on the switching element 142 to turn on the light source block 2B when the positive electrode of the DC power supply 100 is connected to the first power supply connecting terminal t12 and the voltage level of the first power supply connecting terminal t12 is equal to or more than a predetermined reference voltage. When the voltage level of the first power supply connecting terminal t12 is less than the reference voltage, the control circuit 15 turns off the switching element 142 to turn off the light source block 2B. Also, the control circuit 15 controls the voltage value of the output voltage of the voltage conversion circuit 11 so as to be a predetermined value.

The protection circuits 21 and 22 include the same circuit configuration as each other, and thus the circuit configuration of the protection circuit 21 is described, and the description of the circuit configuration of the protection circuit 22 is omitted for sake of brevity.

The protection circuit 21 includes the switching element 210 that is connected between the first power supply connecting terminal t11 and the first input terminal t31. This switching element 210 includes a P-channel MOSFET that has a drain electrode connected to the first power supply connecting terminal t11, and a source electrode connected to the first input terminal t31. The switching element 210 is constituted of the MOSFET and thus includes a parasitic diode 211. This parasitic diode 211 is connected in a direction in which current flows from the first power supply connecting terminal t11 to the first input terminal t31. A parallel circuit of a Zener diode 212 and a resistor 213 is connected between the gate electrode and the source electrode of the switching element 210. A series circuit (backward voltage protection circuit 51) of the resistor 215 and the Zener diode 216 is connected between the gate electrode and the drain electrode of the switching element 210. The gate electrode of the switching element 210 is electrically connected to the second power supply connecting terminal t21 via the resistor 214, the switching element 230 of the voltage determination circuit 23, and the switching element 310 of the reset circuit 30.

Also, the protection circuit 21 includes a voltage determination circuit 23, and the protection circuit 22 includes a voltage determination circuit 24. The voltage determination circuits 23 and 24 include the same circuit configuration as each other, and thus the circuit configuration of the voltage determination circuit 23 is described, and the description of the circuit configuration of the voltage determination circuit 24 is again omitted for sake of brevity.

The voltage determination circuit 23 includes a switching element 230 and resistors 231 and 232. A series circuit of the resistors 231 and 232 is electrically connected between the first power supply connecting terminal t11 and the second power supply connecting terminal t21. The switching element 230 includes an N-channel MOSFET that has a drain electrode connected to a first end of the resistor 214, a source electrode connected to the drain electrode of the switching element 310, and a gate electrode connected to a connection point of the resistor 231 and the resistor 232. In the state where the DC power supply 100 is connected to the first power supply connecting terminal t11, the switching element 230 is turned on, and in the state where the DC power supply 100 is not connected to the first power supply connecting terminal t11, the switching element 230 is turned off.

The reset circuit 30 includes a switching element 310 that is turned on or off according to an oscillation signal of an oscillation circuit 150 in the control circuit 15. The switching element 310 includes an N-channel MOSFET that has a drain electrode connected to the source electrodes of the switching elements 230 and 240, and a source electrode connected to the second power supply connecting terminal t21. The oscillation signal of the oscillation circuit 150 inputted into the gate electrode of the switching element 310, and when the signal level of the oscillation signal becomes low, the switching element 310 is turned off.

Next, the operation of the circuit device 1 of the present embodiment will be described.

When the switch 101 is turned on in the state where the switches 101 and 102 are in the off-state and a power supply voltage is applied to the first power supply connecting terminal t11, at first, the power supply voltage is applied to the voltage conversion circuit 11 via the parasitic diode 211, and the voltage conversion circuit 11 starts to operate. Also, when determining that the power supply voltage is applied to only the first power supply connecting terminal t11, the control circuit 15 controls the voltage conversion circuit 11 to output a voltage that is required to turn on the light source block 2A, and turns on the switching element 141 to turn on the light source block 2A. Also, when the power supply voltage is applied to the first power supply connecting terminal t11 or t12, the oscillation circuit 150 of the control circuit 15 starts an oscillation operation, and outputs, to the gate electrode of the switching element 310, the oscillation signal that is a pulse signal of a rectangular wave having a predetermined frequency and a predetermined duty cycle.

Also, when the power supply voltage of the DC power supply 100 is applied to the first power supply connecting terminal t11, a voltage generated by the resistors 231 and 232 dividing this power supply voltage is applied to the gate electrode of the switching element 230. Here, a division ratio of the resistors 231 and 232 is set so that the voltage generated by the resistors 231 and 232 dividing the power supply voltage of the DC power supply 100 exceeds a threshold voltage of the switching element 230. Thus, when the power supply voltage of the DC power supply 100 is applied to the first power supply connecting terminal t11, the switching element 230 is turned on.

In the circuit device 1 in FIG. 1, the switching element 310 is constituted of the N-channel MOSFET, and when the voltage level of the oscillation signal inputted into the gate electrode of the switching element 310 becomes high, the switching element 310 is turned on. When the switching element 310 is turned on, the voltage generated by the resistors 213 and 214 dividing an input voltage of the first input terminal t31 is applied to the gate electrode of the switching element 210. Here, when a voltage of the gate electrode of the switching element 210 is less than a voltage of the source electrode and the difference of the both potential is equal to or more than the threshold voltage, the switching element 210 is turned on. Then, an input current from the first power supply connecting terminal t11 begins to flow through a channel part between the drain and the source, which has a low conductive voltage compared with the parasitic diode 211.

A Zener diode 212 is connected between the gate electrode and the source electrode of the switching element 210. When the power supply voltage applied to the first input terminal t31 exceeds a Zener voltage of the Zener diode 212, the Zener diode 212 conducts. Accordingly, a voltage more than the Zener voltage is not applied between the gate electrode and the source electrode of the switching element 210. Thus, if an element having a Zener voltage less than a withstanding voltage of the switching element 210 is selected as the Zener diode 212, a voltage more than the withstanding voltage is not applied to the switching element 210. When the upper limit of the power supply voltage of the DC power supply 100 is low and does not exceed the withstanding voltage between the gate and the source of the switching element 210, the Zener diode 212 may be omitted.

Then, when a high period of the oscillation signal outputted from the oscillation circuit 150 is ended and the voltage level of the oscillation signal is low, the switching element 310 of the reset circuit 30 is in an off-state. When the switching element 310 is in the off-state, the current flowing through the resistors 213 and 214 is approximately zero. Thus, the voltage between the gate and the source of the switching element 210 is approximately zero, and the switching element 210 is turned off. Even if the switching element 210 is turned off, the input current from the first power supply connecting terminal t11 continues flowing through the voltage conversion circuit 11 via the parasitic diode 211, and thus the input current flowing through the voltage conversion circuit 11 is not interrupted.

Then, when the voltage level of the oscillation signal outputted from the oscillation circuit 150 becomes high, the switching element 310 is turned on, and the switching element 210 is turned on. Accordingly, the input current flows through the voltage conversion circuit 11 from the DC power supply 100 via the channel part between the drain and the source of the switching element 210.

Also, when the switch 102 is turned on and the power supply voltage is applied to the first power supply connecting terminal t12, the protection circuit 22 performs the same operation as the protection circuit 21, and the power supply voltage is applied to the voltage conversion circuit 11 via the switching element 220. Also, when determining that the power supply voltage is applied to the first power supply connecting terminal t12, the control circuit 15 turns on the switching element 142, and causes the constant current to flow from the constant current circuit 13 to the light source block 2B to turn on the light source block 2B.

Next, an operation when the switch 102 is turned off to turn off the light source block 2B in the state where the switches 101 and 102 are turned on, and the power supply voltage is applied to the first power supply connecting terminals t11 and t12, and the light source blocks 2A and 2B are turned on will be described below. The circuit device 1 operates as described below when the switch 102 is turned off while the switching element 310 is in an on-state and the switching elements 210 and 220 are in the on-state. Because the switching element 220 is in the on-state, the power supply voltage applied to the first power supply connecting terminal t11 is applied to the first power supply connecting terminal t12 via the switching element 220, and the switching element 240 of the voltage determination circuit 24 remains in the on-state. Accordingly, because the switching element 220 remains in the on-state and the voltage level of the first power supply connecting terminal t12 becomes high, the control circuit 15 does not determine that the switch 102 is turned off, and continues turning on the light source block 2B.

Then, when the high period of the oscillation signal outputted from the oscillation circuit 150 ends and the voltage level of the oscillation signal becomes low, the switching element 310 of the reset circuit 30 is turned off. When the switching element 310 is turned off, the voltage between the gate and the source of each of the switching elements 210 and 220 is approximately zero, and then the switching elements 210 and 220 are turned off. When the switching element 220 is turned off, the power supply voltage is not applied to the first power supply connecting terminal t12, and thus the voltage level of the first power supply connecting terminal t12 is decreased, and the switching element 240 is turned off. When the switching element 240 is turned off, even if the voltage level of the oscillation signal outputted from the oscillation circuit 150 is high and the switching element 310 is turned on, the power supply voltage is not applied to the first power supply connecting terminal t12, and thus the switching element 220 remains in an off-state. Also, the voltage level of the first power supply connecting terminal t12 is approximately zero, and the control circuit 15 can determine that the power supply voltage is not applied to the first power supply connecting terminal t11, and thus the control circuit 15 turns off the light source block 2B. Note that, even if the switching element 210 is temporarily turned off, the power supply voltage is applied to the first power supply connecting terminal t11, and thus the current continues flowing via the parasitic diode 211, and the light source block 2A remains in the on-state.

As described above, because the reset circuit 30 periodically performs the reset operation of temporarily turning off the switching elements 210 and 220, the control circuit 15 can certainly determine whether or not the power supply voltage is applied to the first power supply connecting terminals t11 and t12. Thus, when the power supply voltage is not applied to the first power supply connecting terminals t11 or t12, the control circuit 15 can certainly turn off the corresponding light source blocks 2A and 2B.

Note that, a delay time occurs, which corresponds to a time when an oscillation output of the oscillation circuit 150 switches from high to low, before the control circuit 15 determines the state where the input voltage is not applied to the first power supply connecting terminals t11 and t12. In the present embodiment, although an oscillation cycle of the oscillation circuit 150 is set to about several milliseconds to several ten milliseconds, and this degree of the delay time is not a practical problem in the case of illumination even if the turning off is delayed.

Also, the frequency of the oscillation signal outputted from the oscillation circuit 150 may be set according to the maximum value of the delay time that is allowed before the state where the power supply voltage is not applied to the first power supply connecting terminals t11 and t12 is determined. Also, when the high period of the oscillation signal is longer than the low period thereof, on times of the switching elements 210 and 220 are longer than off times thereof, the time when the current flowing through the parasitic diodes 211 and 221 is short, and thus it is preferable in the point of reducing circuit loss. The low period of the oscillation signal outputted from the oscillation circuit 150 is preferably set to a longer period than a period required to a time point when the switching elements 210 and 220 of the protection circuits 21 and 22 are turned off from a time point when the oscillation signal switches from high to low. However, in a period when the oscillation signal outputted from the oscillation circuit 150 is low, current flows through the parasitic diodes 211 and 221. Thus, the period when the oscillation signal is low is preferably set to a moderately short period to reduce the loss in the protection circuits 21 and 22.

Also, when the DC power supply 100 is connected to the circuit device 1 of the present embodiment with reverse polarity, the voltages of the gate electrode of the switching elements 210 and 220 are the same as the voltages of the source electrode, and thus the switching elements 210 and 220 are not turned on. Also, the parasitic diodes 211 and 221 of the switching elements 210 and 220 are in a reverse direction, and thus the parasitic diodes 211 and 221 are not turned on. Accordingly, when the DC power supply 100 is connected with reverse polarity, the protection circuits 21 and 22 cause input current not to flow through the voltage conversion circuit 11 and protect the voltage conversion circuit 11.

Incidentally, in the protection circuits 21 and 22, Zener diodes 216 and 226 are disposed between the gate electrodes and the drain electrodes of the switching elements 210 and 220 so that cathodes are connected to the gate electrodes. When the surge voltage that exceeds the withstanding voltage is applied between the drain and the source of the switching element 210 in a reverse direction, the Zener diode 216 of the backward voltage protection circuit 51 is turned on, and the current flows via the resistors 213 and 215. When the surge voltage that exceeds the withstanding voltage is applied between the drain and the source of the switching element 220 in a reverse direction, the Zener diode 226 of the backward voltage protection circuit 52 is turned on, and the current flows via the resistors 223 and 225. Also, when the voltage across the resistor 213 exceeds a threshold of the switching element 210, the switching element 210 is turned on. When the voltage across the resistor 223 exceeds the threshold of the switching element 220, the switching element 220 is turned on. Accordingly, when the backward voltage that applied to the load circuit 10 is applied for a short time such as a surge voltage, it is possible to protect the switching element 210 even if the surge voltage that exceeds the withstanding voltage is applied between the drain and the source of the switching element 210 in a reverse direction, and it is possible to protect the switching element 220 even if the surge voltage that exceeds the withstanding voltage is applied between the drain and the source of the switching element 220 in a reverse direction. Thus, it is possible to use an element having a lower withstanding voltage as the switching elements 210 and 220, and a voltage of the on-state can be decreased by the withstanding voltages of the switching elements 210 and 220 being reduced, and then it is possible to reduce the loss of the switching elements 210 and 220.

The backward voltage Vx when the switching element 210 is turned on satisfies the following formula (1), where Vz1 represents the Zener voltage of the Zener diode 216, Vth1 represents the threshold voltage of the switching element 210, R213, R214 and R215 are resistor values of the resistors 213, 214 and 215, respectively, for example.

[Formula 1]

$$Vx = Vz1 + Vth1 \times \left(1 + R215 \times \frac{R213 + R214}{R213 \times R214}\right) \quad (1)$$

Note that, when the backward voltage including the surge voltage does not exceed the withstanding voltages of the switching elements 210 and 220, the backward voltage protection circuits 51 and 52 are not required in the protection circuits 21 and 22. Also, when elements for suppressing the surge voltage are connected between the first power supply connecting terminals t11 and t12 and the second power supply connecting terminal t21 so that the backward voltage does not exceed the withstanding voltages of the switching elements 210 and 220, the backward voltage protection circuits 51 and 52 are not required in the protection circuits 21 and 22.

Also, a capacitor may be connected between the gate and the source of each of the switching elements 210 and 220 so that the switching elements 210 and 220 are not turned off by mistake by noise and the like. However, when the capacitor is connected between the gate and the source of each of the switching elements 210 and 220, a delay time until the switching elements 210 and 220 are turned off is long, and accordingly a low period of the oscillation signal outputted from the oscillation circuit 150 is required to be long.

Incidentally, the reset circuit 30 of the present embodiment forcibly turns off the switching elements 210 and 220 by intercepting the current flowing through the resistor connected between the gate and the source of each of the switching elements 210 and 220. The reset circuit 30 is not limited to the above circuit configuration.

Figure 2:
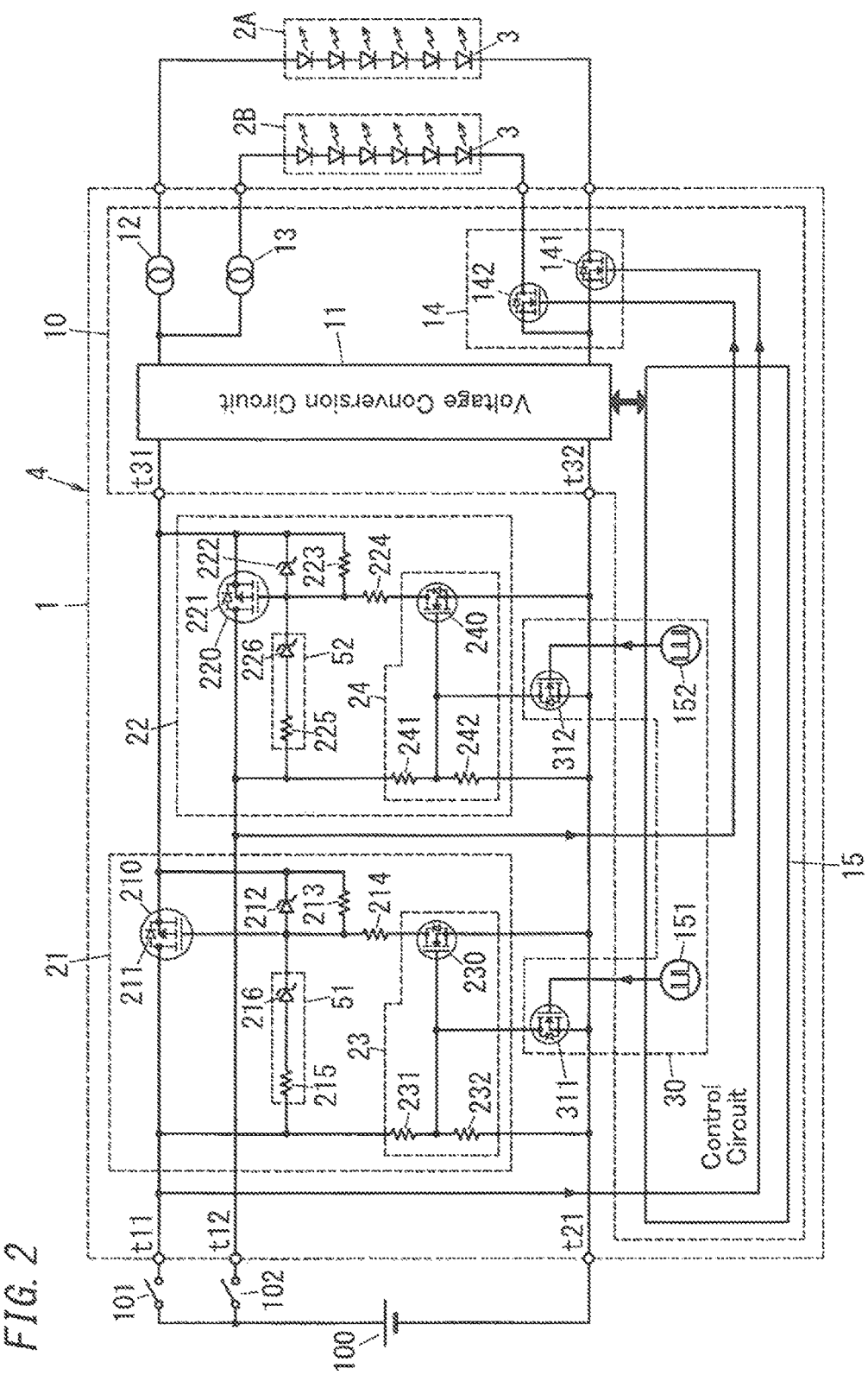
FIG. 2 is a circuit diagram of a lighting device according to another aspect of Embodiment 1.

FIG. 2 shows another circuit configuration of the reset circuit 30. Note that, the configuration other than the reset circuit 30 is the same as the circuit shown in FIG. 1. Thus, further description of same components will be omitted for sake of brevity.

The reset circuit 30 shown in FIG. 2 includes a switching element 311 and a switching element 312. The switching element 311 is turned on or off according to the oscillation signal from the oscillation circuit 151 of the control circuit 15. The switching element 312 is turned on or off according to the oscillation signal from the oscillation circuit 152 of the control circuit 15.

Each of the switching elements 311 and 312 is an N-channel MOSFET, for example. A drain electrode of the switching element 311 is electrically connected to the gate electrode of the switching element 230, and a source electrode of the switching element 311 is electrically connected to the source electrode of the switching element 230. An oscillation signal having a rectangular wave and outputted from the oscillation circuit 151 is inputted into a gate electrode of the switching element 311. When the signal level of the oscillation signal becomes high, the switching element 311 is turned on, and when the signal level of the oscillation signal becomes low, the switching element 311 is turned off.

Similarly, the drain electrode of the switching element 312 is electrically connected to the gate electrode of the switching element 240, and the source electrode of the switching element 312 is electrically connected to the source electrode of the switching element 240. The oscillation signal having a rectangular wave and outputted from the oscillation circuit 152 is inputted into the gate electrode of the switching element 312. When the signal level of the oscillation signal becomes high, the switching element 312 is turned on, and when the signal level of the oscillation signal becomes low, the switching element 312 is turned off.

Here, the oscillation signal outputted from the oscillation circuits 151 and 152 is a signal in which a relationship between the high period and the low period is reverse against that of the oscillation signal outputted from the oscillation circuit 150 of the circuit device 1 in FIG. 1.

In addition, a frequency of the oscillation signal outputted from the oscillation circuit 151 may be set according to the maximum value of the delay time period that is allowed before the state where the power supply voltage is not applied to the first power supply connecting terminal t11 is detected. A frequency of the oscillation signal outputted from the oscillation circuit 152 may be set according to the maximum value of the delay time period that is allowed before the state where the power supply voltage is not applied to the first power supply connecting terminal t12 is detected. Also, when the low period of the oscillation signal is longer than the high period thereof, the on period of the switching element 210 is longer than the off period thereof, and the time period during which the current flows though the parasitic diode 211 is short, and it is preferable in the point of reducing the loss of circuit. When the low period of the oscillation signal is longer than the high period thereof, the on period of the switching element 220 is longer than the off period thereof, and the time period during which the current flows though the parasitic diode 221 is short, and it is preferable in the point of reducing the loss of circuit. The low period of the oscillation signal outputted from the oscillation circuit 151 is preferably set to a period longer than a period to be required to a time point when the switching element 210 of the protection circuit 21 is turned off from a time point when the oscillation signal switches from high to low. The low period of the oscillation signal outputted from the oscillation circuit 152 is preferably set to a period longer than a period to be required to a time point when the switching element 220 of the protection circuit 22 is turned off from a time point when the oscillation signal switches from high to low. However, in the high period of the oscillation signal outputted from the oscillation circuit 151, current flows through the parasitic diode 211. Thus it is preferable that the high period of the oscillation signal is set to a moderately short time to reduce the loss of the protection circuit 21. In the high period of the oscillation signal outputted from the oscillation circuit 152, current flows through the parasitic diode 221. Thus it is preferable that the high period of the oscillation signal is set to a moderately short time to reduce the loss of the protection circuit 22.

As described above, the control circuit 15 includes the oscillation circuits 151 and 152. The oscillation circuit 151 corresponds to the protection circuit 21 and determines timing for turning off periodically the switching element 210 of the protection circuit 21. The oscillation circuit 152 corresponds to the protection circuit 22 and determines timing for turning off periodically the switching element 220 of the protection circuit 22. Here, the phase of the oscillation signal having a rectangular wave and outputted from the oscillation circuit 151 is preferably shifted against the phase of the oscillation signal having a rectangular wave and outputted from the oscillation circuit 152 so that the off periods of the switching elements 210 and 220 are different from each other. Accordingly, the switching elements 210 and 220 are not turned off at the same timing, and when one of the switching elements 210 and 220 is turned off, the input current flows through the other that is in the on-state. Thus, the time period is decreased during which the current flows through the parasitic diodes 211 and 221 of the switching elements 210 and 220, and then the loss of the circuit device 1 can be reduced.

Incidentally, when the switching element 210 is turned off by the oscillation signal inputted from the oscillation circuit 151, the input current flows through the parasitic diode of the switching element 210 that is the MOSFET, and then loss is increased although it is a short period. When the switching element 220 is turned off by the oscillation signal inputted from the oscillation circuit 152, the input current flows through the parasitic diode of the switching element 220 that is the MOSFET, and then loss is increased although it is a short period.

The voltage determination circuit 23 determines whether or not the power supply voltage is applied to the corresponding first power supply connecting terminal t11. The voltage determination circuit 24 determines whether or not the power supply voltage is applied to the corresponding first power supply connecting terminal t12. Thus, the control circuit 15 can determine whether or not the power supply voltage is applied to the first power supply connecting terminal t11, by monitoring the potential at the connection point of the resistors 231 and 232. The control circuit 15 can determine whether or not the power supply voltage is applied to the first power supply connecting terminal t12, by monitoring the potential at the connection point of the resistors 241 and 242. Then, when determining that the power supply voltage is applied to only one of the first power supply connecting terminals t11 and t12, the control circuit 15 may stop the oscillation operations of the oscillation circuits 151 and 152. When the oscillation circuits 151 and 152 stop the oscillation operations, the reset circuit 30 stops a reset operation for forcibly turning off the switching elements 210 and 220. When the power supply voltage is applied to only the one of the first power supply connecting terminals t11 and t12, the state where the power supply voltage is not applied is detected certainly, and then it is possible to reduce the circuit loss generated by performing the reset operation by stopping the reset operation.

Also, in the circuit device 1 in which the circuit diagram is shown in FIG. 1 and FIG. 2, the control circuit 15 includes the oscillation circuits 150, 151 and, 152. The oscillation circuits 150, 151, and 152 determine the timings for periodically turning off the switching elements 210 and 220. However, the protection circuits 21 and 22 each may include the oscillation circuits.

Figure 3:
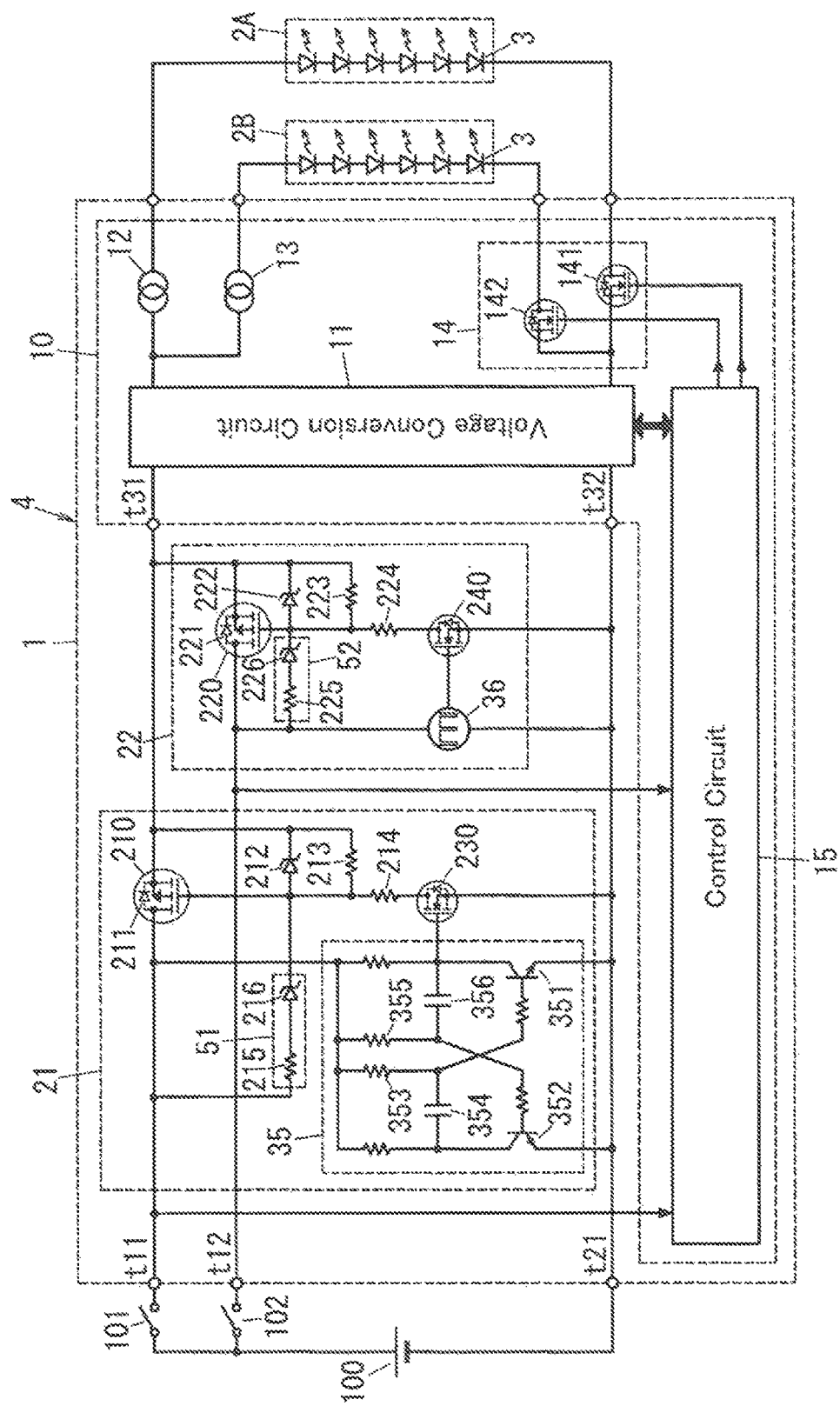
FIG. 3 is a circuit diagram of a lighting device according to yet another aspect of Embodiment 1.

For example, as shown in FIG. 3, the protection circuits 21 and 22 each may include the oscillation circuits 35 and 36 that determine the timing for periodically turning off the switching elements 210 and 220.

The oscillation circuit 35 is an astable multivibrator circuit that includes transistors 351 and 352, resistors 353 and 355, and capacitors 354 and 356. The pulse signal outputted from the oscillation circuit 35 is inputted into the gate electrode of the switching element 230. In this case, the off period of the switching element 230 is determined based on the resistor 355 and the capacitor 356, and the on period of the switching element 230 is determined based on the resistor 353 and the capacitor 354. Note that the oscillation circuit 35 is not limited to the astable multivibrator circuit illustrated in the diagram and may be another oscillation circuit. The oscillation circuit 36 has the same circuit configuration as the oscillation circuit 35, and the description of the oscillation circuit 36 is omitted.

The oscillation circuit 35 obtains a voltage required for operation from the power supply voltage applied to the first power supply connecting terminal t11 connected to the protection circuit 21. The oscillation circuit 36 obtains a voltage required to the operation with the power supply voltage applied to the first power supply connecting terminal t12 connected to the protection circuit 22. That is, when the power supply voltage is not applied to the first power supply connecting terminals t11 and t12, the oscillation circuits 35 and 36 do not perform the oscillation operations, and the signal levels of the output signals of the oscillation circuits 35 and 36 are low. Accordingly, the switching elements 230 and 240 are turned off, and the switching elements 210 and 220 are not turned on.

When the power supply voltage is applied to the first power supply connecting terminals t11 and t12 from the DC power supply 100, the oscillation circuits 35 and 36 start the oscillation operations, the switching elements 230 and 240 are periodically turned off, and accordingly the switching elements 210 and 220 are periodically turned off.

Thus, when the power supply voltage is stopped being applied to one of the first power supply connecting terminals t11 and t12 in the state where the power supply voltage is applied to the first power supply connecting terminals t11 and t12, the switching element 210 or 220 can be turned off, which is connected to the first power supply connecting terminal to which the power supply voltage is not applied. Thus, the control circuit 15 can certainly detect that the power supply voltage is stopped being applied to the one of the first power supply connecting terminals t11 and t12.

As described above, the circuit device 1 of the present embodiment includes the plurality of first power supply connecting terminals t11 and t12, the second power supply connecting terminal t21, the load circuit 10, the plurality of protection circuits 21 and 22, and the reset circuit 30. The plurality of first power supply connecting terminals t11 and t12 are connected to the first one of the positive electrode and the negative electrode of the DC power supply 100 (positive electrode in the present embodiment). The second power supply connecting terminal t21 is connected to the second one of the positive electrode and the negative electrode of the DC power supply 100 (negative electrode in the present embodiment). The load circuit 10 includes the first input terminal t31 and the second input terminal t32. The first input terminal t31 is electrically connected to the plurality of first power supply connecting terminals t11 and t12 in the state where the plurality of first power supply connecting terminals t11 and t12 are connected in parallel to each other. The second input terminal t32 is electrically connected to the second power supply connecting terminal t21. The plurality of protection circuits 21 and 22 are respectively disposed between the plurality of first power supply connecting terminals t11 and t12 and the first input terminal t31. Each of the plurality of protection circuits 21 and 22 includes the switching element 210 (220) and the rectifier element (parasitic diode 211 (221)). The switching element 210 (220) is connected between the corresponding first power supply connecting terminal t11 (t12) and the first input terminal t31. The switching element 210 (220) is turned on when the DC power supply 100 is connected with a normal polarity to the corresponding first power supply connecting terminal t11 (t12). The rectifier element (parasitic diode 211 (221)) is connected in parallel to the switching element 210 (220) in direction where the current having a normal polarity can flow between the corresponding first power supply connecting terminal t11 (t12) and the first input terminal t31. The reset circuit 30 is configured to periodically perform the reset operation of temporarily turning off the switching element 210 (220) of each of the plurality of protection circuits 21 and 22.

The protection circuits 21 and 22 are respectively constituted of the switching elements 210 and 220 and the rectifier elements, and the switching elements 210 and 220 are turned on when the DC power supply 100 is connected with a normal polarity to the first power supply connecting terminals t11 and t12. Thus, the low loss protection circuit can be achieved. Also, because the reset circuit 30 periodically turns off the switching elements 210 and 220, it is possible to reduce the possibility that the switching element 210 or 220 connected to the first power supply connecting terminal t11 or t12 to which the power supply voltage is not applied continues being in the on-state. Thus, it is possible to certainly determine whether or not the power supply voltage is applied to the first power supply connecting terminals t11 and t12 by the switching element 210 or 220 connected to the first power supply connecting terminal t11 or t12 to which the power supply voltage is not applied being turned off.

Also, in the light source lighting circuit of Document 1, power supply is supplied from one of the first and second control terminals. On the other hand, in the circuit device 1 of the present embodiment, electric power can be supplied from the plurality of first power supply connecting terminals, and accordingly, it is possible to decrease the current value of the current flowing through each first power supply connecting terminal.

In the circuit device 1 of the present embodiment, the plurality of protection circuits 21 and 22 may respectively include the backward voltage protection circuits 51 and 52. When the backward voltage that is more than the threshold voltage is applied to the switching element 210 (220) of the protection circuit 21 (22), the backward voltage protection circuit 51 (52) turns on the switching element 210 (220).

Thus, it is possible to reduce the possibility that the backward voltage that is more than the threshold voltage is applied to the switching elements 210 and 220, and then low withstanding-voltage elements can be used as the switching elements 210 and 220.

In the circuit device 1 of the present embodiment, the reset circuit 30 may stop the reset operation when the DC power supply 100 is connected to only one of the plurality of first power supply connecting terminals t11 and t12.

When the reset circuit 30 performs the reset operation, the switching element is temporarily turned off, and the current flows through the rectifier element (parasitic diode 211 or 221) connected in parallel to the switching element, and accordingly the loss is increased. In the case where the power supply voltage is applied to only one first power supply connecting terminal, when the power supply voltage is not applied to the remaining first power supply connecting terminal(s), the switching element(s) of all the protection circuit(s) to which the power supply voltage is not applied is turned off, and accordingly, the reset operation is not required to periodically perform. Thus, it is possible to reduce the loss of the circuit device 1 by stopping the reset operation.

Also, the reset circuit 30 may shift, to each other, the timings for turning off at least two switching elements (including a first switching element and a second switching element) of the plurality of switching elements 210 and 220. Thus, when the first switching element is forcibly turned off, the input current flows through the second switching element that is not turned off more than the rectifier element connected in parallel to the first switching element that is turned off. Thus, the input current flows through the switching element that has a lower loss than that of the rectifier element, and accordingly, it is possible to reduce the loss of the circuit device 1.

Also, the reset circuit 30 may include the plurality of oscillation circuits 151 and 152 that respectively correspond to the plurality of switching elements 210 and 220. The reset circuit 30 periodically performs the reset operation for temporarily turning off the corresponding switching element 210 (220) according to the oscillation signal outputted from each of the plurality of oscillation circuits 151 and 152. Then, each of the plurality of oscillation circuits 151 and 152 may stop the oscillation operation while outputting the oscillation signal for turning off the corresponding switching element 210 (220) when the power supply voltage applied to the first power supply connecting terminal t11 (t12) to which the corresponding switching element 210 (220) is connected is equal to or less than the minimum operation voltage. Thus, the power consumption can be decreased by stopping the oscillation circuit corresponding to the switching element connected to the first power supply connecting terminal to which the power supply voltage is not applied.

Also, the lighting device 4 of the present embodiment includes the circuit device 1 described in the present embodiment and a housing that houses the circuit device 1, and the load circuit 10 of the circuit device 1 includes the voltage conversion circuit 11 that supplies electric power to the light source (light source blocks 2A and 2B) to turn on the light source.

Thus, it is possible to provide the lighting device 4 that includes the low loss protection circuits 21 and 22 protecting reverse connection of the DC power supply. Also, it is possible to provide the lighting device 4 that can certainly determine whether or not the power supply voltage is applied to the plurality of first power supply connecting terminals t11 and t12.

Embodiment 2

Figure 4:
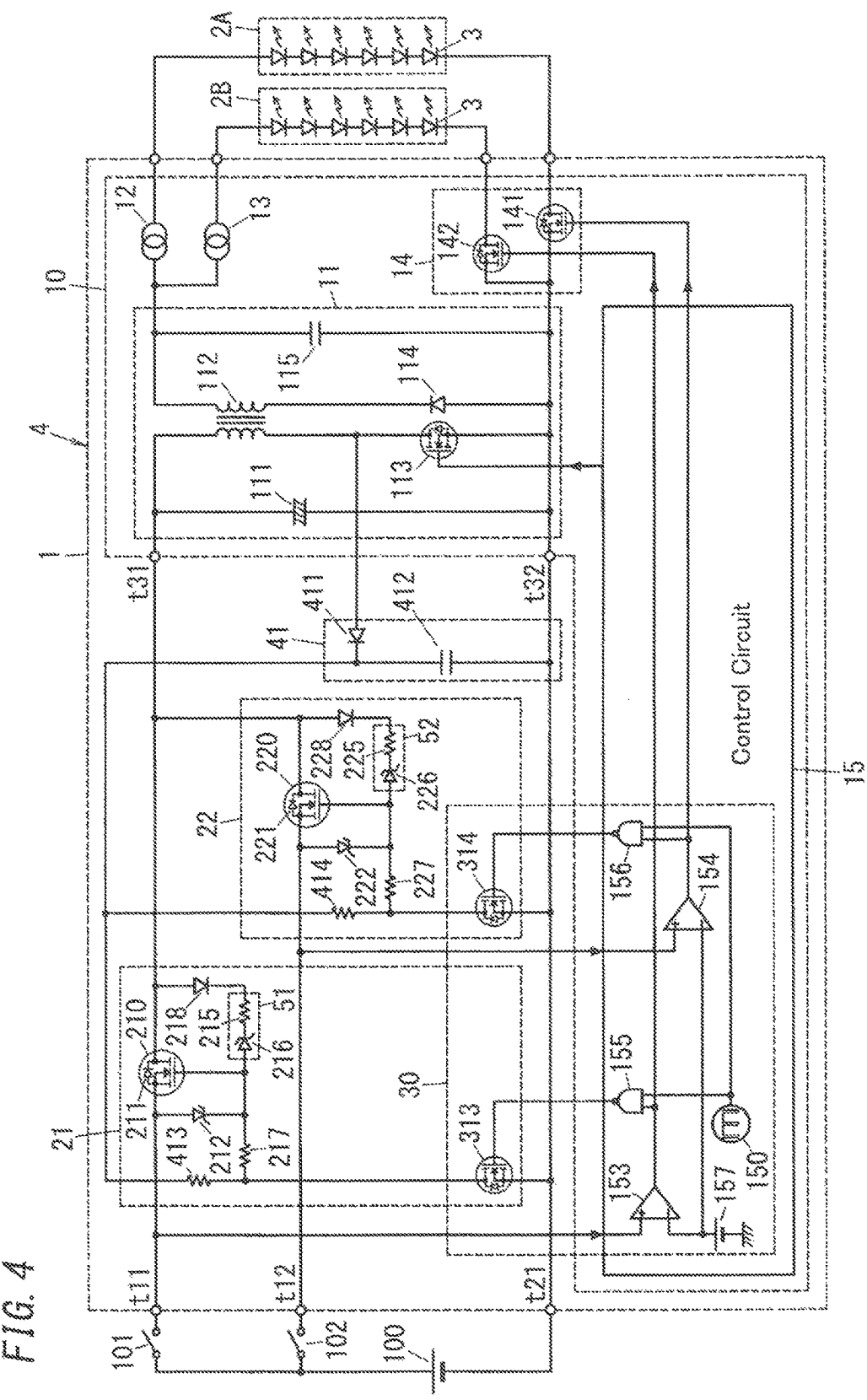
FIG. 4 is a circuit diagram of a lighting device according to Embodiment 2.

FIG. 4 is a circuit diagram of a lighting device 4 that includes a circuit device 1 of Embodiment 2. Note that circuit configurations other than a voltage conversion circuit 11, a control circuit 15, protection circuits 21 and 22, and an auxiliary power circuit 41 are the same as those of the circuit device 1 of Embodiment 1. Thus, further description of same components is omitted for sake of brevity.

The voltage conversion circuit 11 is a switching power supply circuit such as a fly-back converter, and includes a capacitor 111, a transformer 112, a switching element 113, a diode 114, and a capacitor 115. The capacitor 111 is electrically connected between a first input terminal t31 and a second input terminal t32. A primary winding of the transformer 112 and the switching element 113 are connected in series to each other between both ends of the capacitor 111. The switching element 113 includes an N-channel MOSFET, and a drain electrode of the switching element 113 is connected to a first end of the primary winding of the transformer 112, and a source electrode of the switching element 113 is connected to the second input terminal t32. Also, a cathode of the diode 114 is connected to a first end of a secondary winding of the transformer 112, and the capacitor 115 is connected between an anode of the diode 114 and a second end of the secondary winding of the transformer 112. Then, both ends of the capacitor 115 are respectively connected to the output terminals of the voltage conversion circuit 11. The PWM signal is inputted into a gate electrode of the switching element 113 from the control circuit 15, and the DC voltage into which the input voltage is converted occurs by the switching element 113 switching according to the PWM signal.

The control circuit 15 includes an oscillation circuit 150, comparators 153 and 154, NAND gates 155 and 156, and a reference supply 157. The comparator 153 compares an input voltage of the first power supply connecting terminal t11 with a reference voltage outputted from the reference supply 157 in magnitude. The comparator 154 compares an input voltage of the first power supply connecting terminal t12 with a reference voltage outputted from the reference supply 157 in magnitude. An oscillation signal (pulse signal having a rectangular wave) of the oscillation circuit 150 and an output signal of the comparator 153 are inputted into the NAND gate 155, and an output of the NAND gate 155 is inputted into the gate electrode of the switching element 313. The oscillation signal of the oscillation circuit 150 and an output signal of the comparator 154 are inputted into the NAND gate 156, and an output of the NAND gate 156 is inputted into the gate electrode of the switching element 314. Also, when the output signal of the comparator 153 becomes high, the control circuit 15 turns on the switching element 141 to turn on the light source block 2A. When the output signal of the comparator 154 becomes high, the control circuit 15 turns on the switching element 142 to turn on the light source block 2B. When the output signal of the comparator 153 becomes low, the control circuit 15 turns off the switching element 141 to turn off the light source block 2A. When the output signal of the comparator 154 becomes low, the control circuit 15 turns off the switching element 142 to turn off the light source block 2B.

Although, in Embodiment 1, the switching elements 210 and 220 of the protection circuits 21 and 22 are the P-channel MOSFETs, in the present embodiment, the switching elements 210 and 220 of the protection circuits 21 and 22 are the N-channel MOSFETs.

The polarity of the parasitic diode of the N-channel MOSFET is reversed in direction compared to the polarity of the parasitic diode of the P-channel MOSFET. Thus, the source electrodes of the switching elements 210 and 220 are connected to the first power supply connecting terminals t11 and t12, and the drain electrodes of the switching elements 210 and 220 are connected to the first input terminal t31.

An anode of the Zener diode 212 is connected to the source electrode of the switching element 210, and a cathode of the Zener diode 212 is connected to the gate electrode of the switching element 210. An anode of the Zener diode 216 is connected to the gate electrode of the switching element 210. A cathode of the diode 218 is connected to the cathode of the Zener diode 216 via the resistor 215, and an anode of the diode 218 is connected to the drain electrode of the switching element 210. Also, the gate electrode of the switching element 210 is connected to the drain electrode of the switching element 313 via the resistor 217, and the source electrode of the switching element 313 is connected to the second power supply connecting terminal t21.

Similarly, the anode of the Zener diode 222 is connected to the source electrode of the switching element 220, and the cathode of the Zener diode 222 is connected to the gate electrode of the switching element 220. The anode of the Zener diode 226 is connected to the gate electrode of the switching element 220. The cathode of the diode 228 is connected to the cathode of the Zener diode 226 via the resistor 225, and the anode of the diode 228 is connected to the drain electrode of the switching element 220. Also, the gate electrode of the switching element 220 is connected to the drain electrode of the switching element 314 via the resistor 227, and the source electrode of the switching element 314 is connected to the second power supply connecting terminal t21.

The auxiliary power circuit 41 includes a diode 411 and a capacitor 412. The diode 411 has an anode connected to a connection point of the primary winding of the transformer 112 and the switching element 113. The capacitor 412 is connected between a cathode of the diode 411 and the second input terminal t32. First ends of the resistors 413 and 414 are connected to a connection point of the diode 411 and the capacitor 412. A second end of the resistor 413 is connected to a gate of the switching element 210 via the resistor 217, and a second end of the resistor 414 is connected to a gate of the switching element 220 via the resistor 227. The auxiliary power circuit 41 rectifies, with the diodes 411, a higher voltage than the power supply voltage that occurs to the switching element 113 when a switching operation of the voltage conversion circuit 11, and then smoothes the rectified voltage with the capacitor 412. Then, the voltage across the capacitor 412 is applied to a gate electrode of the switching element 210 via the resistors 413 and 217, and applied to a gate electrode of the switching element 220 via the resistors 414 and 227.

Here, to turn on the switching elements 210 and 220, a voltage that is higher than that of the source electrodes by a threshold voltage is required to be applied to the gate electrodes of the switching elements 210 and 220. Even if the voltage conversion circuit 11 performs the switching operation, the auxiliary power circuit 41 outputs the higher voltage than the power supply voltage, and it is possible to certainly drive the switching elements 210 and 220, by this voltage being used as driving voltages for the switching elements 210 and 220.

In the circuit device 1 in FIG. 4, when the switch 101 is in an off-state, a voltage of the first power supply connecting terminal t11 is lower than the reference voltage of the reference supply 157, and a voltage level of an output signal of the comparator 153 is low, and an output of the NAND gate 155 is high. In this case, the switching element 313 is turned on, and an auxiliary power supply voltage applied by the auxiliary power circuit 41 is not applied to the gate electrode of the switching element 210, and a voltage between the gate and the source of the switching element 210 is approximately zero, and then the switching element 210 is turned off.

When the switch 101 is turned on and the voltage of the first power supply connecting terminal t11 is higher than the reference voltage of the reference supply 157, a voltage level of an output signal of the comparator 153 becomes high. An inversion signal is outputted from the NAND gate 155. High/low of the inversion signal is reverse against that of the oscillation signal of the oscillation circuit 150. The on/off states of the switching element 313 are switched according to the inversion signal. When the switching element 313 is turned on, the switching element 210 is turned off. On the other hand, when the switching element 313 is turned off, the output voltage of the auxiliary power circuit 41 is applied to the gate electrode of the switching element 210 via the resistors 413 and 217, and a potential of the gate electrode exceeds a threshold voltage, and then the switching element 210 is turned on.

Thus, when the power supply voltage is applied to the first power supply connecting terminal t11, the switching element 210 is periodically turned off by the switching element 313 being turned on/off according to the inversion signal outputted from the NAND gate 155. Even if the switching element 210 is turned off, when the power supply voltage is applied to the first power supply connecting terminal t11, the input current continually flows through the voltage conversion circuit 11 via the parasitic diode 211 of the switching element 210.

Note that an operation of the protection circuit 22 when the switch 102 is turned on is the same as that of the protection circuit 21, and the description thereof is omitted.

In the circuit device 1 of the present embodiment, the circuit for determining the turning on/off of the light source blocks 2A and 2B (comparators 153 and 154 and the like) constitutes a part of a circuit for determining the turning on/off of the switching elements 210 and 220. Note that, the circuit configuration that is the circuit for determining the turning on/off of the light source blocks 2A and 2B and constitutes the part of the circuit for determining the turning on/off of the switching elements 210 and 220 may be applied to the circuit device 1 of another embodiment.

Also, in the present embodiment, the backward voltage protection circuit 51 and the diode 218 are connected in series between the drain and the gate of the switching element 210, and the backward voltage protection circuit 52 and the diode 228 are connected in series between the drain and the gate of the switching element 220. The diode 218 is disposed in a direction of preventing a current from flowing through the backward voltage protection circuit 51 with the driving voltage applied to the gate electrode of the switching element 210, and the decrease of the driving voltage is reduced, and the switching element 210 is certainly turned on. The diode 228 is disposed in a direction of preventing a current from flowing through the backward voltage protection circuit 52 with the driving voltage applied to the gate electrode of the switching element 220, and the decrease of the driving voltage is reduced, and the switching element 220 is certainly turned on. Note that when the enough high gate voltage is obtained even if the diodes 218 and 228 are not disposed, the diodes 218 and 228 may not be omitted.

Also, although, as the circuit configuration of the auxiliary power circuit 41, a circuit configuration is shown, which rectifies and smoothes the higher voltage than the power supply voltage that occurs to the switching element 113 when the switching of the voltage conversion circuit 11, the circuit configuration of the auxiliary power circuit 41 is not limited to the circuit configuration shown in FIG. 4. For example, the auxiliary power circuit 41 may be a power supply circuit that rectifies and smoothes a voltage that occurs to an auxiliary wiring of the transformer 112 of the voltage conversion circuit 11. Also, when the output voltage of the voltage conversion circuit 11 is higher than the power supply voltage applied to the first power supply connecting terminals t11 and t12, the auxiliary power circuit 41 may be a circuit that applies the output voltage of the voltage conversion circuit 11 as it is to the gate electrodes of the switching elements 210 and 220. Also, the auxiliary power circuit 41 may be a circuit that applies a voltage supplied from another power supply to the gate electrodes of the switching elements 210 and 220.

As described above, the load circuit 10 may include the voltage conversion circuit 11, and each of the protection circuits 21 and 22 may further include an auxiliary power circuit 41 that obtains driving voltages for turning on the switching elements 210 and 220 with a voltage occurred to circuit components that constitutes the voltage conversion circuit 11.

Thereby, there is an advantage that a dedicated power supply circuit is not required to be disposed for obtaining the driving voltages for turning on the switching elements 210 and 220 of the protection circuits 21 and 22.

Figure 5:
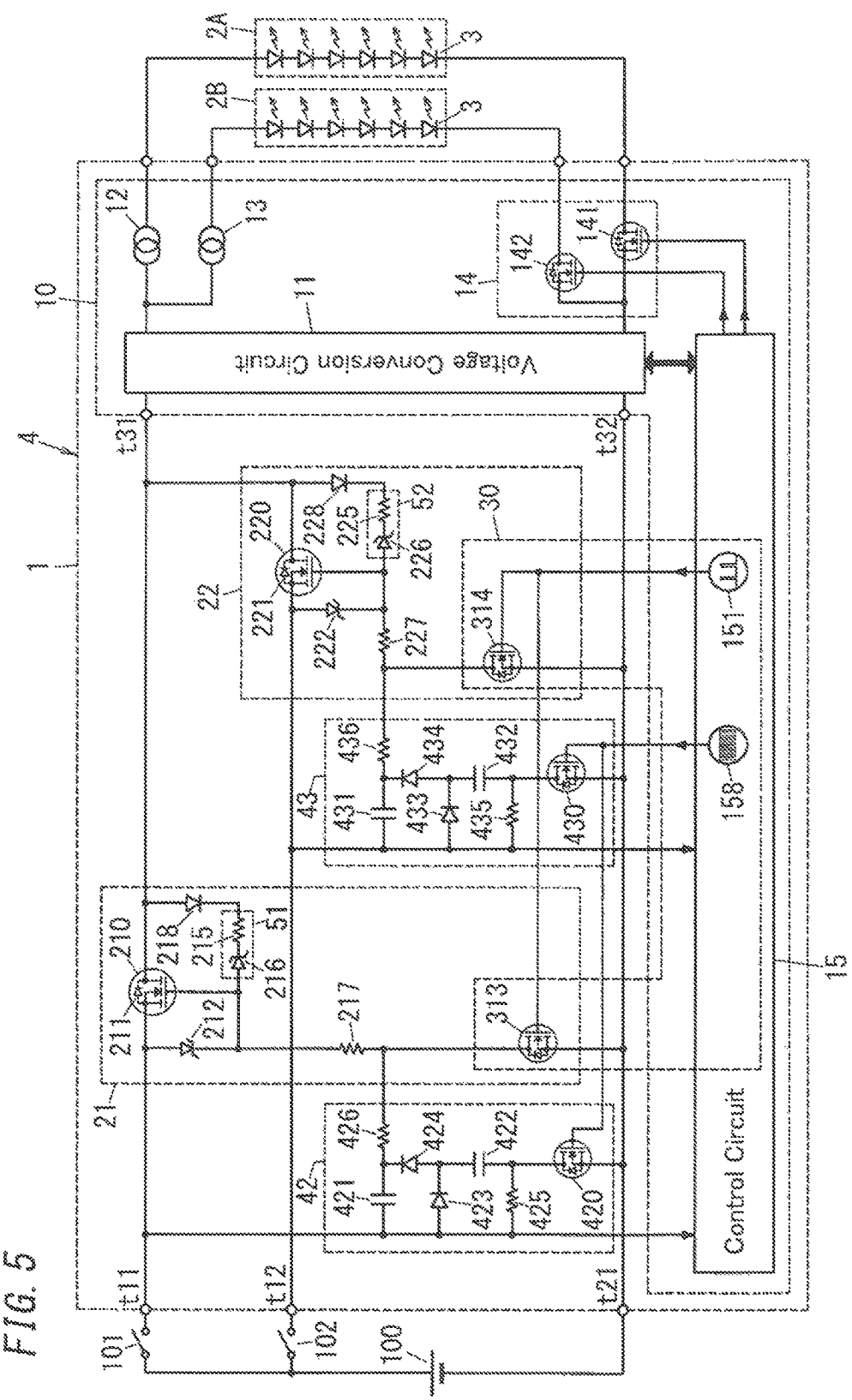
FIG. 5 is a circuit diagram of a lighting device according to another aspect of Embodiment 2.

Also, in the circuit device 1 whose circuit diagram is shown in FIG. 4, the auxiliary power circuit 41 supplies the driving voltages to both of the two protection circuits 21 and 22, but as shown in FIG. 5, the circuit device 1 may include two auxiliary power circuits 42 and 43 that respectively supply the driving voltages to two protection circuits 21 and 22. Note that the circuit device 1 whose circuit diagram shown in FIG. 5 is the same as the circuit device 1 of Embodiment 1 other than a control circuit 15 and the auxiliary power circuits 42 and 43. Thus, further description of same components is omitted for sake of brevity.

The auxiliary power circuit 42 supplies, to the protection circuit 21, a driving voltage that is required to drive the switching element 210 using the power supply voltage applied to the first power supply connecting terminal t11 connected to the protection circuit 21. The auxiliary power circuit 43 supplies, to the protection circuit 22, a driving voltage that is required to drive the switching element 220 using the power supply voltage applied to the first power supply connecting terminal t12 connected to the protection circuit 22. The auxiliary power circuits 42 and 43 are voltage multipliers each that include a charge pump circuit, and can supply a voltage higher than the power supply voltage to the gate electrodes of the switching elements 210 and 220. The auxiliary power circuits 42 and 43 have the common circuit configurations to each other, and the auxiliary power circuit 42 will be described, and description of the auxiliary power circuit 43 is omitted.

The auxiliary power circuit 42 is a charge-pump-type voltage multiplier that includes a switching element 420, capacitors 421 and 422, diodes 423 and 424, and resistors 425 and 426. A first end of the resistor 425 is connected to the first power supply connecting terminal t11. The drain electrode of the switching element 420 is connected to a second end of the resistor 425, and a source electrode of the switching element 420 is connected to the second power supply connecting terminal t21. An anode of the diode 423 is connected to the first power supply connecting terminal t11, and a cathode of the diode 423 is connected to a drain electrode of the switching element 420 via the capacitor 422. Also, a first end of the capacitor 421 is connected to the first power supply connecting terminal t11, a cathode of the diode 424 is connected to a second end of the capacitor 421, and an anode of the diode 424 is connected to a cathode of the diode 423. Further, a connection point of the capacitor 421 and the diode 424 is connected to a gate electrode of the switching element 210 via the resistors 426 and 217.

An oscillation signal of the oscillation circuit 158 of the control circuit 15 is inputted into the gate electrode of the switching element 420. The switching element 420 is turned on/off according to the oscillation signal having high frequency, which is inputted from the oscillation circuit 158. When the switching element 420 is turned on, current flows through the capacitor 422 via the diode 423, and then the capacitor 422 is charged. When the switching element 420 is turned off, the capacitor 422 is discharged, and then the capacitor 421 is charged via the resistor 425 and the diode 424. The capacitor 421 is charged to be a voltage substantially equal to the power supply voltage by the switching element 420 repeating to turn on/off, and a voltage of a connection point of the capacitor 421 and the resistor 426 is a voltage higher than the power supply voltage by the charging voltage of the capacitor 421.

Here, when the switching element 313 of the reset circuit 30 is turned off according to the oscillation signal inputted from the oscillation circuit 151 of the control circuit 15, the charging voltage of the capacitor 421 is applied to the gate electrode of the switching element 210 via the resistors 426 and 217. In this time, the switching element 210 is turned on, and the power supply voltage is applied to the voltage conversion circuit 11 via the switching element 210.

On the other hand, when the switching element 313 of the reset circuit 30 is turned on, a voltage applied to the gate electrode of the switching element 210 is substantially zero, and the switching element 210 is turned off. Note that when the power supply voltage is applied to the first power supply connecting terminal t11, the parasitic diode 211 of the switching element 210 is turned on, and the power supply voltage is supplied to the voltage conversion circuit 11 via the parasitic diode 211.

Here, the on period of the switching element 313 may be set so that a period when the reset circuit 30 turns off the switching element 210 is longer than a period when a voltage of the capacitor 421 is decreased so as to be equal to or less than a threshold voltage of the switching element 210.

As describe above, the circuit device 1 may further include a plurality of auxiliary power circuits 42 and 43 respectively corresponding to the plurality of switching elements 210 and 220. Each of the plurality of auxiliary power circuits 42 and 43 obtains the operation voltage with the power supply voltage applied to the first power supply connecting terminal t11 (t12) to which the corresponding switching element is connected. Then, each of the plurality of auxiliary power circuits 42 and 43 is configured to supply, to the protection circuit 21 or 22, a driving voltage for turning on the corresponding switching element.

The auxiliary power circuits 42 and 43 obtains the operation voltage with the power supply voltage applied to the first power supply connecting terminals t11 and t12, and thus it is possible to certainly turn off the switching element when the power supply voltage is not applied to the first power supply connecting terminals t11 and t12.

In Embodiments 1 and 2 described above, the switching elements 210 and 220 of the protection circuits 21 and 22 are MOSFETs, but the switching elements 210 and 220 may be bipolar transistors such as IGBT (Insulated Gate Bipolar Transistor). The bipolar transistor such as the IGBT includes no parasitic diode unlike the MOSFET, and thus, when the switching elements 210 and 220 are bipolar transistors, diodes may be connected in parallel to the switching elements 210 and 220.

Also, although the number of first power supply connecting terminals t11 and t12 is two in Embodiments 1 and 2 described above, the number of first power supply connecting terminals may be three or more.

Furthermore, although the load circuit 10 is a lighting circuit turning on the light source in Embodiments 1 and 2 described above, the load circuit 10 is not limited to the lighting circuit and may be a circuit for operating a load other than the light source. Furthermore, the circuit device 1 of each of Embodiments 1 and 2 is configured to switch the light source block to be turned on of the light source blocks 2A and 2B according to which or not the power supply voltage is applied to the first power supply connecting terminals t11 and t12 in each of Embodiments 1 and 2. However, the circuit device 1 may be configured to switch the output levels, the operation modes of the lighting device 4, or the like according to which or not the power supply voltage is applied to the first power supply connecting terminals t11 and t12.

Also, each of the configurations of the circuit devices 1 described in Embodiments 1 and 2 is one example, and the circuit device 1 is not limited to these particular examples. The circuit configuration and the like may be appropriately modified within the scope without departing the technical idea of the present invention. Also, the control circuit 15 of each of the circuit device 1 in Embodiments 1 and 2 may be achieved with an analog circuit, a digital circuit, or a circuit in which an analog circuit and a digital circuit are mixed. Also, a part or all of functions of the control circuit 15 may be executed by a microcomputer executing software.

Note that, in Embodiments 1 and 2 described above, one second power supply connecting terminal is connected to the negative electrode of the DC power supply 100, the plurality of first power supply connecting terminals are connected to the positive electrode of the DC power supply 100, and the protection circuit is disposed in each of the plurality of first power supply connecting terminals, but the circuit device 1 is not limited to the above configuration. That is, one second power supply connecting terminal (common connection terminal) may be connected to the positive electrode of the DC power supply 100, the plurality of first power supply connecting terminals may be connected to the negative electrode of the DC power supply 100, and the protection circuit may be disposed in each of the plurality of first power supply connecting terminals.

Embodiment 3

Figure 6:
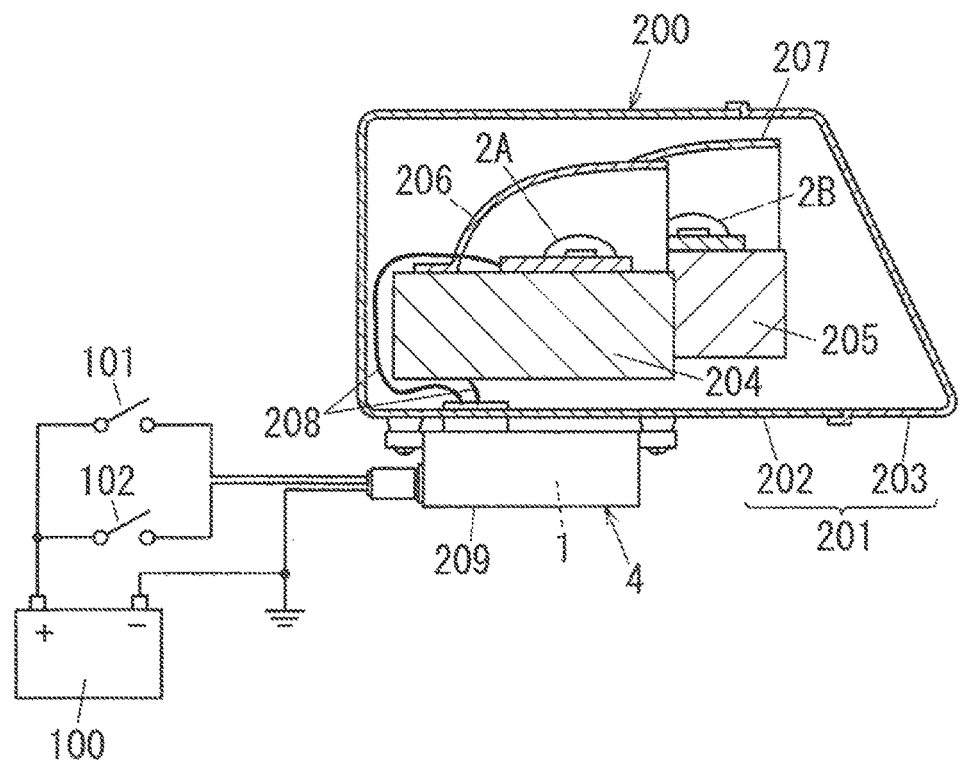
FIG. 6 is a schematic view of a configuration of a fixture body according to Embodiment 3.

FIG. 6 is a schematic configuration view of an illumination device (fixture) 200 into which a lighting device 4 including the circuit device 1 of Embodiment 1 or 2 is assembled.

Figure 7:
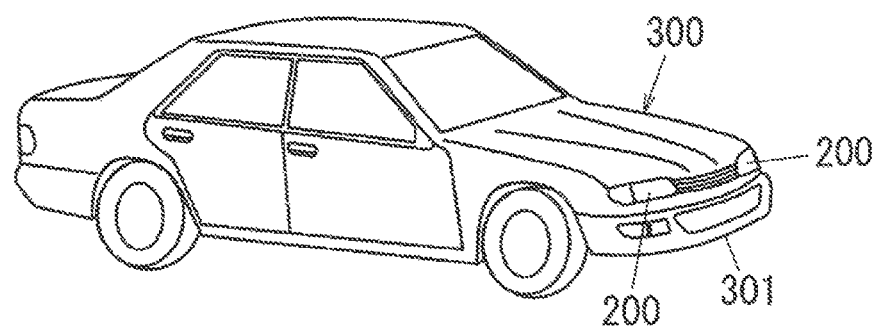
FIG. 7 is an external perspective view of a vehicle according to Embodiment 3.

The illumination device 200 of the present embodiment is, for example, a headlight device included in a vehicle 300, and FIG. 7 is an external view of the vehicle 300 in which the illumination device 200 is positioned on a vehicle body 301.

The case 201 of the illumination device 200 includes a box-shaped body 202 in which one surface is opened, and a translucent cover 203 disposed in an opening of the body 202. Two light source blocks 2A and 2B are accommodated in the body 202. In the light source blocks 2A and 2B, for example, the light source block 2A is a light source for main-beam headlight (high beam), and the light source block 2B is a light source for dipped-beam headlight (low beam). The light source blocks 2A and 2B are respectively amounted on heat radiation structures 204 and 205, the heat radiation structures 204 and 205 are made of aluminum alloy, for example, and formed into shapes that are appropriate for radiation, such as fin-shapes. The reflection members 206 and 207 are respectively disposed on the heat radiation structures 204 and 205, and the reflection members 206 and 207 respectively control the light source blocks 2A and 2B. Also, a subcase 209 housing the circuit device 1 in Embodiment 1 or 2 is disposed an under side of the body 202. The light source blocks 2A and 2B are electrically connected, via a lead wires 208, to the voltage conversion circuit 11 accommodated in the subcase 209.

First power supply connecting terminals t11 and t12 of the circuit device 1 are connected to a positive electrode of a DC power supply 100 (battery of vehicle 300), via the switches 101 and 102, respectively. A second power supply connecting terminal t21 of the circuit device 1 is connected to a negative electrode of the DC power supply 100.

Here, when the switch 101 is turned on, the power supply voltage is applied to the light source block 2A, and the light source block 2A is turned on. When the switch 102 is turned on, the power supply voltage is applied to the light source block 2B, and the light source block 2B is turned on. Thus, the switches 101 and 102 can be used for switching between high beam and low beam in addition to switching turning on/off the headlight.

The illumination device 200 of the present embodiment includes the lighting device 4 of Embodiment 1 or 2, the light source (light source blocks 2A and 2B) that is turned on by the lighting device 4, and the case 201 that houses the lighting device 4 and the light source.

Thereby, it is possible to provide the illumination device 200 including the lighting device 4 that includes the low loss protection circuits 21 and 22 protecting a reverse connection of the DC power supply.

The vehicle 300 of the present embodiment includes the lighting device 4, the light source (light source blocks 2A and 2B), and the vehicle body 301. The light source is turned on with electric power supplied from the lighting device 4. The light source is disposed on the vehicle body 301.

Thereby, it is possible to provide the vehicle 300 including the lighting device 4 that includes the low loss protection circuits 21 and 22 protecting a reverse connection of the DC power supply. Also, it is possible to certainly determine which or not the power supply voltage is applied to the plurality of first power supply connecting terminals t11 and t12, and to provide the vehicle 300 including the lighting device 4 capable of modify the states of the light source blocks 2A and 2B according to the determination result.

The invention claimed is:

1. A circuit device comprising:
    a plurality of first power supply connecting terminals that are connected to first one of a positive electrode and a negative electrode of a DC power supply;
    a second power supply connecting terminal that is connected to second one of the positive electrode and the negative electrode of the DC power supply;
    a load circuit;
    a plurality of protection circuits; and
    a reset circuit,
    wherein
    the load circuit includes,
        a first input terminal that is electrically connected to the plurality of first power supply connecting terminals in a state where the plurality of first power supply connecting terminals are connected in parallel to each other, and
        a second input terminal that is electrically connected to the second power supply connecting terminal,
    the plurality of protection circuits are respectively disposed between the plurality of first power supply connecting terminals and the first input terminal,
    each of the plurality of protection circuits includes
        a switching element that is connected between a corresponding first power supply connecting terminal of the plurality of first power supply connecting terminals and the first input terminal and is turned on when the DC power supply is connected with a forward polarity to the corresponding first power supply connecting terminal, and
        a rectifying element that is connected in parallel to the switching element between the corresponding first power supply connecting terminal and the first input terminal in a direction where a current having a forward polarity flows, and
    the reset circuit is configured to periodically perform a reset operation of temporarily turning off the switching element in each of the plurality of protection circuits.

2. The circuit device according to claim 1, wherein each of the plurality of protection circuits includes a backward voltage protection circuit that turns on the switching element of the corresponding protection circuit when a backward voltage that exceeds a threshold voltage is applied to the switching element.

3. The circuit device according to claim 1, wherein the reset circuit is configured to stop the reset operation when the DC power supply is connected to only one of the plurality of first power supply connecting terminals.

4. The circuit device according to claim 1, wherein the reset circuit determines timings for turning off the switching elements of the plurality of protection circuits so that at least two switching elements of the switching elements of the plurality of protection circuits are not turned off at a same timing.

5. The circuit device according to claim 1, wherein:

the reset circuit includes a plurality of oscillation circuits that respectively correspond to the switching elements of the plurality of protection circuits, the reset circuit is configured to periodically perform a reset operation of turning off the switching element temporarily corresponding to an oscillation circuit according to an oscillation signal outputted by the oscillation circuit for each of the plurality of oscillation circuits, each of the plurality of oscillation circuits is configured to stop an oscillation operation in a state where the oscillation signal for turning off the corresponding switching element is outputted when a power supply voltage applied from a first power supply connecting terminal connected to the corresponding switching element is equal to or less than a minimum operation voltage.

6. The circuit device according to claim 1, wherein:
the load circuit includes a voltage conversion circuit, and
each of the plurality of protection circuits further includes an auxiliary power circuit that receives a driving voltage for turning on the switching element from a voltage occurring to a circuit component constituting the voltage conversion circuit.

7. The circuit device according to claim 1, further comprising a plurality of auxiliary power circuits that respectively correspond to the plurality of switching elements,
wherein each of the plurality of auxiliary power circuits is configured to receive an operation voltage from a power supply voltage applied to the first power supply connecting terminal connected to the corresponding switching element of the plurality of first power supply connecting terminals, and supply an operation voltage for turning on the corresponding switching element to the protection circuit that includes the corresponding switching element of the plurality of protection circuits.

8. The circuit device according to claim 2, wherein the reset circuit is configured to stop the reset operation when the DC power supply is connected to only one of the plurality of first power supply connecting terminals.

9. The circuit device according to claim 2, wherein the reset circuit determines timings for turning off the switching elements of the plurality of protection circuits so that at least two switching elements of the switching elements of the plurality of protection circuits are not turned off at a same timing.

10. The circuit device according to claim 3, wherein the reset circuit determines timings for turning off the switching elements of the plurality of protection circuits so that at least two switching elements of the switching elements of the plurality of protection circuits are not turned off at a same timing.

11. The circuit device according to claim 2, wherein:
the reset circuit includes a plurality of oscillation circuits that respectively correspond to the switching elements of the plurality of protection circuits,
the reset circuit is configured to periodically perform a reset operation of turning off the switching element temporarily corresponding to an oscillation circuit according to an oscillation signal outputted by the oscillation circuit for each of the plurality of oscillation circuits,
each of the plurality of oscillation circuits is configured to stop an oscillation operation in a state where the oscillation signal for turning off the corresponding switching element is outputted when a power supply voltage applied from a first power supply connecting terminal connected to the corresponding switching element is equal to or less than a minimum operation voltage.

12. The circuit device according to claim 3, wherein:
the reset circuit includes a plurality of oscillation circuits that respectively correspond to the switching elements of the plurality of protection circuits,
the reset circuit is configured to periodically perform a reset operation of turning off the switching element temporarily corresponding to an oscillation circuit according to an oscillation signal outputted by the oscillation circuit for each of the plurality of oscillation circuits,
each of the plurality of oscillation circuits is configured to stop an oscillation operation in a state where the oscillation signal for turning off the corresponding switching element is outputted when a power supply voltage applied from a first power supply connecting terminal connected to the corresponding switching element is equal to or less than a minimum operation voltage.

13. The circuit device according to claim 4, wherein:
the reset circuit includes a plurality of oscillation circuits that respectively correspond to the switching elements of the plurality of protection circuits,
the reset circuit is configured to periodically perform a reset operation of turning off the switching element temporarily corresponding to an oscillation circuit according to an oscillation signal outputted by the oscillation circuit for each of the plurality of oscillation circuits,
each of the plurality of oscillation circuits is configured to stop an oscillation operation in a state where the oscillation signal for turning off the corresponding switching element is outputted when a power supply voltage applied from a first power supply connecting terminal connected to the corresponding switching element is equal to or less than a minimum operation voltage.

14. The circuit device according to claim 2, wherein:
the load circuit includes a voltage conversion circuit, and
the circuit device further includes an auxiliary power circuit that receives a driving voltage for turning on the switching element from a voltage generated across a circuit component constituting the voltage conversion circuit.

15. The circuit device according to claim 3, wherein:
the load circuit includes a voltage conversion circuit, and
the circuit device further includes an auxiliary power circuit that receives a driving voltage for turning on the switching element from a voltage generated across a circuit component constituting the voltage conversion circuit.

16. The circuit device according to claim 4, wherein:
the load circuit includes a voltage conversion circuit, and
the circuit device further includes an auxiliary power circuit that receives a driving voltage for turning on the switching element from a voltage generated across a circuit component constituting the voltage conversion circuit.

17. The circuit device according to claim 5, wherein:
the load circuit includes a voltage conversion circuit, and
the circuit device further includes an auxiliary power circuit that receives a driving voltage for turning on the switching element from a voltage generated across a circuit component constituting the voltage conversion circuit.

18. The circuit device according to claim 2, further comprising a plurality of auxiliary power circuits that respectively correspond to the plurality of switching elements,
 wherein each of the plurality of auxiliary power circuits is configured to receive an operation voltage from a power supply voltage applied to the first power supply connecting terminal connected to the corresponding switching element of the plurality of first power supply connecting terminals, and supply an operation voltage for turning on the corresponding switching element to the protection circuit that includes the corresponding switching element of the plurality of protection circuits.

19. A lighting device comprising:
 the circuit device according to claim 1, and
 a housing that accommodates the circuit device,
 wherein the load circuit of the circuit device includes a voltage conversion circuit that supplies electric power to a light source to turn on the light source.

20. A vehicle comprising:
 the lighting device according to claim 19;
 the light source that is turned on with electric power supplied from the lighting device; and
 a vehicle body on which the light source is disposed.

* * * * *